(12) United States Patent
Thuleau et al.

(10) Patent No.: US 9,056,559 B2
(45) Date of Patent: Jun. 16, 2015

(54) SET OF SLIDEWAYS, SEAT COMPRISING SUCH A SET OF SLIDEWAYS AND SUPPORT MEMBER FOR SUCH A SET OF SLIDEWAYS

(75) Inventors: Stéphane Thuleau, Lessay les Chateaux (FR); Sylvain Desquesne, Condé sur Noireau (FR); Nicolas Navatte, Condé sur Noireau (FR)

(73) Assignee: Faurecia Siéges d'Automobile, Nanterre (FR)

( * ) Notice: Subject to any disclaimer, the term of this patent is extended or adjusted under 35 U.S.C. 154(b) by 881 days.

(21) Appl. No.: 12/747,353

(22) PCT Filed: Nov. 26, 2008

(86) PCT No.: PCT/FR2008/052132
§ 371 (c)(1),
(2), (4) Date: Jun. 10, 2010

(87) PCT Pub. No.: WO2009/074760
PCT Pub. Date: Jun. 18, 2009

(65) Prior Publication Data
US 2010/0264288 A1    Oct. 21, 2010

(30) Foreign Application Priority Data
Nov. 12, 2007   (FR) ..................................... 07 08628

(51) Int. Cl.
*B60N 2/02* (2006.01)
*B60N 2/07* (2006.01)
*F16C 1/06* (2006.01)
*B60N 2/06* (2006.01)

(52) U.S. Cl.
CPC ............ *B60N 2/0232* (2013.01); *B60N 2/0705* (2013.01); *B60N 2002/024* (2013.01); *F16C 1/06* (2013.01); *B60N 2/067* (2013.01); *F16C 2326/08* (2013.01)

(58) Field of Classification Search
USPC .......... 248/419, 420, 422, 424, 429; 297/311, 297/312, 330; 296/65.01, 66, 65.02, 65.11, 296/65.13
See application file for complete search history.

(56) References Cited

U.S. PATENT DOCUMENTS

| | | | |
|---|---|---|---|
| 5,348,262 A * | 9/1994 | Isomura ......................... | 248/430 |
| 5,487,520 A * | 1/1996 | Mouri et al. ................... | 248/429 |
| 6,021,990 A | 2/2000 | Freund | |
| 6,065,859 A * | 5/2000 | Breeding ....................... | 366/121 |
| 6,848,664 B2 * | 2/2005 | Ito et al. ........................ | 248/429 |
| 6,854,782 B2 * | 2/2005 | Reichert et al. ............ | 296/65.13 |
| 2004/0094683 A1 * | 5/2004 | Garrido et al. ................ | 248/424 |
| 2006/0144633 A1 * | 7/2006 | Tores ............................ | 180/326 |

FOREIGN PATENT DOCUMENTS

| | | |
|---|---|---|
| DE | 29 25 781 A1 | 1/1981 |
| DE | 199 32 676 A1 | 3/2000 |
| FR | 2 883 810 A | 10/2006 |

* cited by examiner

*Primary Examiner* — Alfred J Wujciak
(74) *Attorney, Agent, or Firm* — Miller, Matthias & Hull LLP

(57) ABSTRACT

The track assembly for a vehicle seat, comprising two parallel tracks, an electric motor, flexible connections connecting the electric motor to the track drive mechanisms and motor support members provided with guides in which the flexible connections are held.

11 Claims, 8 Drawing Sheets

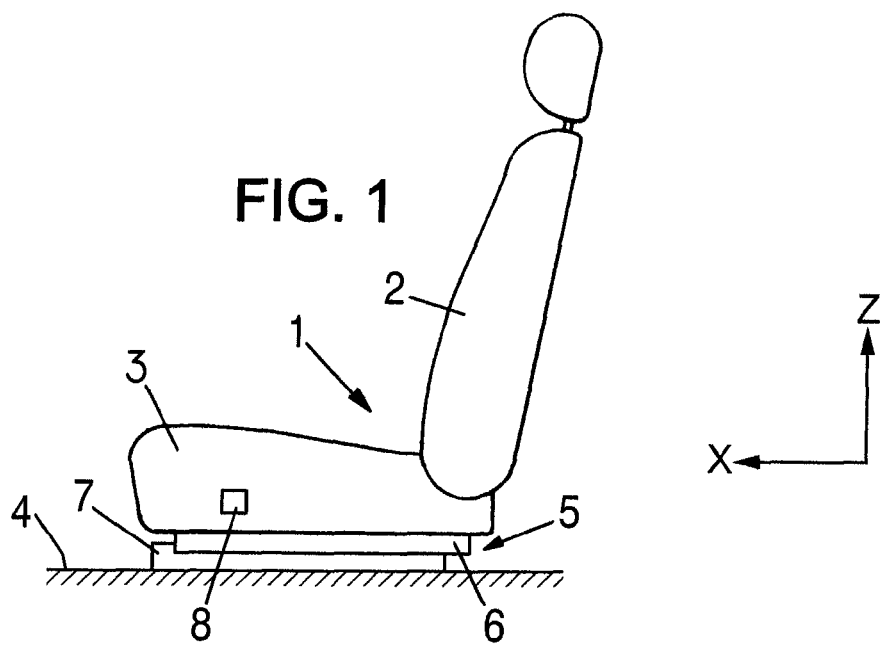
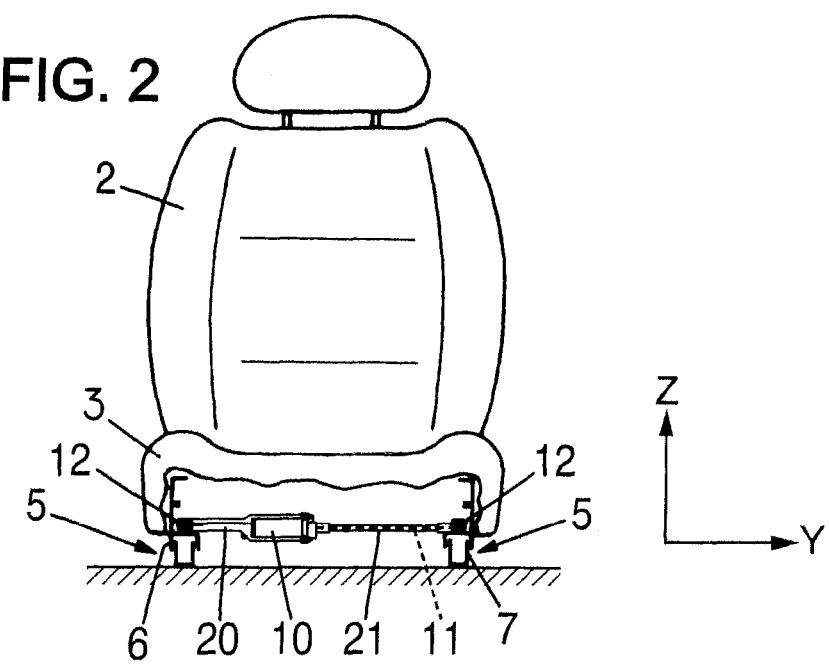

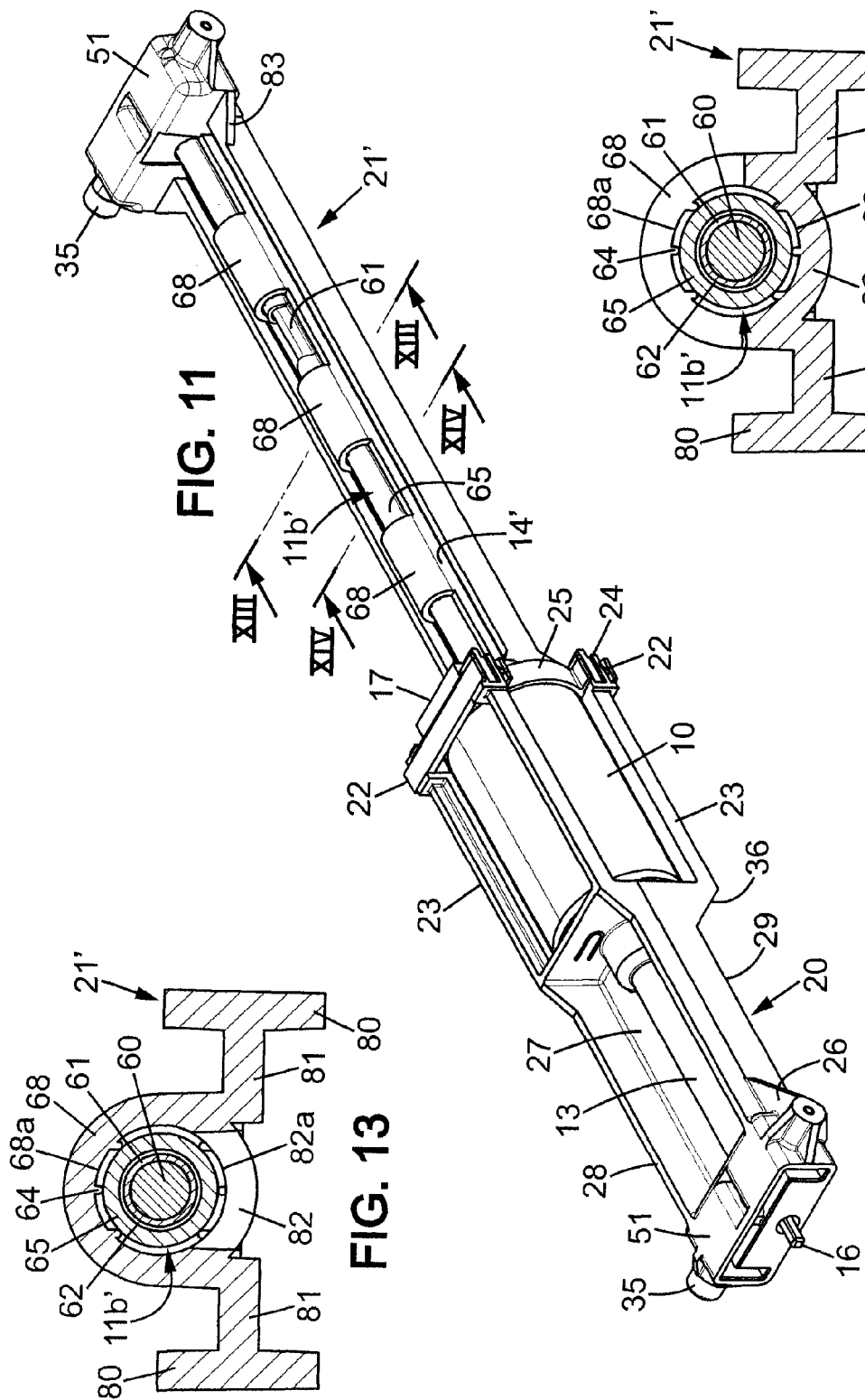

SET OF SLIDEWAYS, SEAT COMPRISING SUCH A SET OF SLIDEWAYS AND SUPPORT MEMBER FOR SUCH A SET OF SLIDEWAYS

CROSS-REFERENCE TO RELATED APPLICATIONS

This application is a U.S. national stage filing under 35 USC §371 of International Patent Application No. PCT/FR2008/052132 filed on Nov. 26, 2008, which claims priority under the Paris Convention to the French Patent Application No. 07 08628, filed on Dec. 11, 2007.

FIELD OF THE DISCLOSURE

This invention relates to track assemblies, to seats comprising such track assemblies and to support members for such track assemblies.

BACKGROUND OF THE DISCLOSURE

More particularly, the invention relates to a track assembly for the seat of a vehicle, comprising:
first and second parallel tracks extending along a longitudinal direction and each comprising an adjustment mechanism,
an electric motor adapted for driving the mechanisms for adjusting said tracks and connected to said adjustment mechanisms via flexible connections,
at least one support member extending along a transversal direction substantially perpendicular to the longitudinal direction and connecting the motor to at least one of first and second tracks, said support member comprising at least one guide adapted for retaining the flexible connection, and fully surrounding flexible connection over at least one portion of its length.

Moreover, the invention further relates to a seat of a vehicle provided with such a track assembly.

Finally, the invention further relates to a support member for such a track assembly.

FR-A-2 883 810 describes an example of such a track assembly.

In the known track assemblies of this type, the support member is a cross member which is fixed at its two ends on the two tracks and which comprises guides in the form of retaining clips of the flexible connections.

Also known in U.S. Pat. No. 6,021,990 is an adjustment mechanism comprising an electric motor and support members which are based on a transverse bar which connects the two tracks.

These known track assemblies provide complete satisfaction. It has however appeared useful to further perfect them, in particular to simplify the mounting.

SUMMARY OF THE DISCLOSURE

To this end, according to the invention, a track assembly of the type in question is characterised in that said support member is fixed exclusively to the electric motor and to one of the first and second tracks and in that said support member alone supports the weight of the electric motor.

Thanks to these arrangements, the mounting of the adjustment mechanism is therefore simplified. In addition, this can allow for the use of simplified flexible connections devoid of protective sheaths, the aforementioned guide then replacing the protective sheath.

In embodiments of the track assemblies according to the invention, one can have recourse furthermore to one and/or the other of the following arrangements:
the flexible connection extends over a certain length and said guide surrounds the flexible connection over a major portion of said length;
said guide is tubular;
said guide comprises, along the flexible connection, a succession of guide troughs arranged alternating on either side of said flexible connection;
the flexible connection comprises a rotating core driven by the motor, said rotating core turning in contact with said guide;
the flexible connection comprises a rotating core driven by the motor, said rotating core turning in a tubular sheath which itself is contained in the guide;
the support member is formed of a single part in plastic material;
the track assembly comprises first and second support members connecting the motor to the first and second tracks, the first support member being shorter than the second support member and being able to support the motor and limit the movement of translation and rotation of the motor;
the support member further comprises:
an anchoring part connected to one of the first and second tracks,
a vertical end plate and parallel to the longitudinal direction, receiving a face of the motor, the guide extending according to the transversal direction between the anchoring part and the end plate and being connected directly to said anchoring part and said end plate,
two horizontal ribs extending on either side of said guide according to the transversal direction between the anchoring part and the end plate and being connected directly to said guide, to said anchoring part and to said end plate,
two vertical ribs, framing respectively the horizontal ribs and integral respectively with said horizontal ribs, said anchoring part and said end plate.
the track assembly comprises first and second support members fixed one to the other;
the first support member comprises flexible arms which each extends along the motor in the transversal direction towards the second support member, down to a free end provided with a hook which is hooked to the second support member;
the first support member comprises at least three arms distributed around the motor;
the motor extends in the longitudinal direction between first and second ends, the first support member comprises a first end plate which receives the first end of the motor, the second support member comprises a second end plate which receives the second end of the motor, the arms of the first support member are integral with the first end plate and the hooks of said arms are hooked onto the second end plate;
the hooks are hooked onto the second end plate in such a way as to prevent a separation of the first and second support members in the transversal direction and are retained on said second end plate by clipping;
at least one of the first and second ends of the motor comprises a portion in relief which cooperates by nesting with a complementary portion in relief arranged in one of the first and second end plates in order to prevent a relative rotation of the motor in relation to said end plate.

Moreover the invention also has for object a seat of a vehicle comprising a seat carried by a track assemblies such as defined hereinabove.

Finally, the invention further has for object a support member for a track assembly such as defined hereinabove, adapted for connecting an electric motor to at least one track for the seat of a vehicle, said support member comprising at least one guide adapted for retaining a flexible connection connecting the motor to a adjustment mechanism belonging to the track, said guide being shaped in order to fully surround the flexible connection sur at least one portion of its length when said flexible connection is mounted on said support.

BRIEF DESCRIPTION OF THE DRAWINGS

Other characteristics and advantages of the invention will appear in the course of the following description of two of its embodiments, provided by way of non-restricted examples, with regards to the attached drawings.

In the drawings:

FIG. 1 is a diagrammatical view of a seat which can include a track assembly according to a first embodiment of the invention, FIG. 2 shows a front view of a partial cross-section of the seat of a vehicle in accordance with FIG. 1, FIG. 9 is a detailed view showing the fastening between the two support members of FIGS. 7 and 8, FIG. 10 is a cross-section view according to the plane X-X in FIG. 5, FIGS. 11 and 12 are similar views respectively to FIGS. 5 and 6, in a second embodiment of the invention, and FIGS. 13 and 14 are cross-section views respectively according to the planes XIII-XIII and XIV-XIV in FIG. 11.

DETAILED DESCRIPTION OF THE DISCLOSURE

In the various figures, the same references designate identical or similar elements.

FIG. 1 shows a seat of a vehicle automobile 1 which comprises a seatback 2 carried by a seat 3 which itself is mounted sliding on the floor 4 of the vehicle in a substantially horizontal longitudinal direction X.

Figure 3:
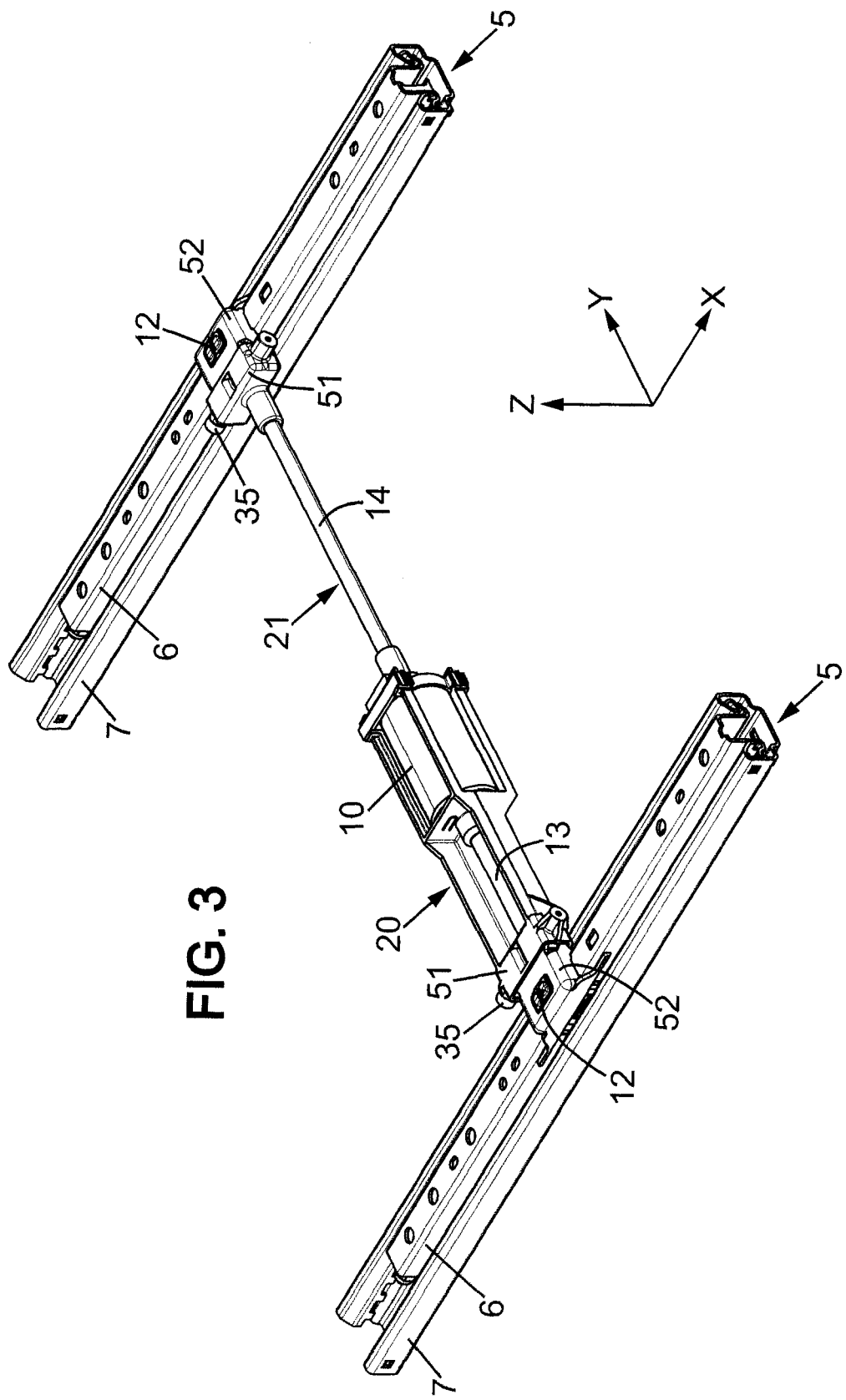
FIG. 3 is a perspective view of the track assembly of the seat in FIG. 1, comprising two tracks connected together via a motorisation device.

The seat 3 is connected to the floor 4 by a set of first and second parallel tracks 5, which can easily be seen in FIGS. 2 and 3. Each one of these said tracks comprises first 6 and second 7 track elements, linked respectively to the seat 3 and to the floor 4, which slide over one another in the longitudinal direction X.

The adjusting of the first and second tracks 5 is motorised, and controlled for example by means of a push-button 8 (FIG. 1) which controls the operation of the motorisation device which can be seen in FIGS. 2 and 3.

The motorisation device comprises an electric motor 10 connected to the tracks 5 by the first and second support members 20, 21 extending according to a horizontal transversal direction Y perpendicular to the longitudinal direction X. These support members 20, 21 are provided with guides 13, 14 in which are housed flexible connections which will be described in more detail hereinafter. Each one of the flexible connections comprises a rotating metal core extending between:

a first end driven in rotation by the rotor of the motor 10,
and a second end driving a drive mechanism 12 with screw and nut carried by the first element 6 of the corresponding track 5 (see the FIG. 3).

The first support member 20 can be shorter than the second support member 21 in the transversal direction Y and can where applicable be adapted in order to support the motor 10 alone. Possibly, the motorisation device could comprise the first support member 20 and no second support member, or a second support member devoid of the guide 14 in which is housed the corresponding flexible connection.

The support member 20 extends according to the horizontal transversal direction Y from the end plate 40 providing interface with the motor to the anchoring part 51 which is coupled with the counterpart 52 integral with the mobile element 6 of the first track 5, by means where applicable of a screw 35 of which the axis is substantially parallel to the longitudinal direction X. As such, the support member 20 is fixed exclusively to the motor 10 and to the mobile element 6 of the first track 5.

This support member is more preferably made of plastic material, and can be more preferably made of a single part, using a method of manufacturing known in the art.

This support member is provided with the guide 13 containing the flexible connection 11 and reinforcement ribs for which details will be provided hereinafter.

In the same manner, the support member 21 extends according to the horizontal transversal direction Y from the end plate 41 providing interface with the motor 10 to the anchoring part 51 which is coupled with the counterpart 52 integral with the mobile element 6 of the second track 5, by means where applicable of a screw 35 of which the axis is substantially parallel to the longitudinal direction X. As such, the support member 21 is fixed exclusively to the motor 10 and to the mobile element 6 of the second track 5.

The support member 21 comprises the guide 14, of tubular shape for example but any other form can be considered, this guide 14 contains the flexible connection 11b.

The support member 21 is manufactured either as a single part or as two or three parts nested by force inside one another. The second support member 21 is more preferably made of plastic material.

Figure 4:
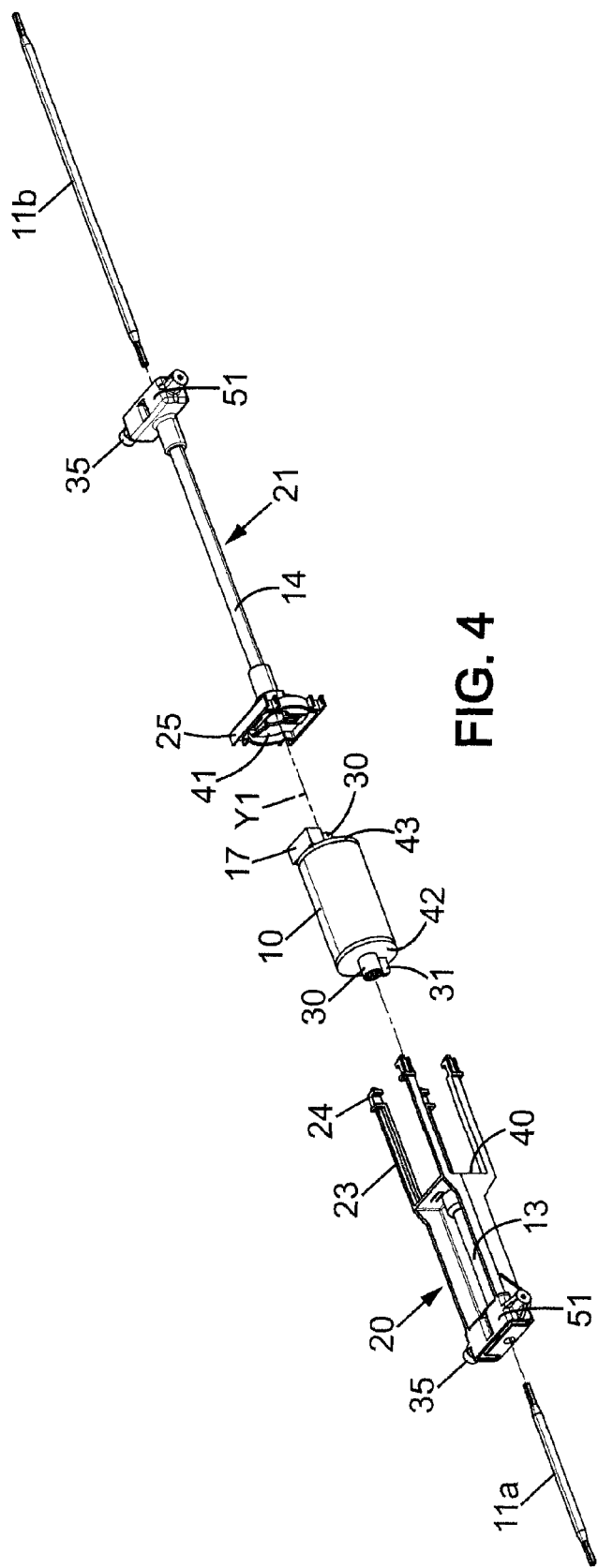
FIG. 4 is a perspective exploded view of the motorisation device in FIG. 3.

FIG. 4 shows an exploded view of the motorisation device comprising the motor, the first support member, where applicable the second support member, the first flexible connection 11a and where applicable the second flexible connection 11b. FIG. 4 makes it possible in particular to show the method for assembling the motorisation device. The support member 20 is provided with a plurality of flexible arms 23 which extend along the axis Y1 towards the second support member and of which the detailed description will be provided hereinafter. The number of flexible arms 23 can be four as in the figures for example, but it can also be equal to three or at most four and the distribution around the jacket of the motor can also be of any sort. Furthermore, the flexible arms can where applicable be connected together by bridges. It can however be designed that the first support member 20 be provided, in the place of arms, with wider partitions, while still remaining within the scope of this invention.

The motor is inserted into the first support member 20 by translation according to the axis Y1. Said motor slides longitudinally between the flexible arms 23, until the face 42 of said motor is in contact with the end plate 40 of the support member. A portion in relief 31 which will be described hereinafter makes possible the immobilisation in rotation of the motor in relation to the support member around the axis Y1.

The second support member 21 is also assembled by translation, towards the motor in parallel to the axis Y1, until the end plate 41 of the end 25 of said second support member comes to nest into the face 43 of the motor 10. A second portion in relief 31 also makes it possible to immobilise in rotation the motor with this second support member around the axis Y1.

A first flexible connection 11a is then engaged, always in parallel to the axis Y1 in the guide 13 provided for this purpose in the support member 20. The engagement ends with the insertion of the end 18 of the flexible connection into the tip 30 of the motor. In the same manner, the second flexible connection 11b is engaged by the tip of the support member 21, always in parallel to the axis Y1, then is engaged inside in the guide 14 and engages at the end of travel in the tip 30 of the motor.

Figure 5:
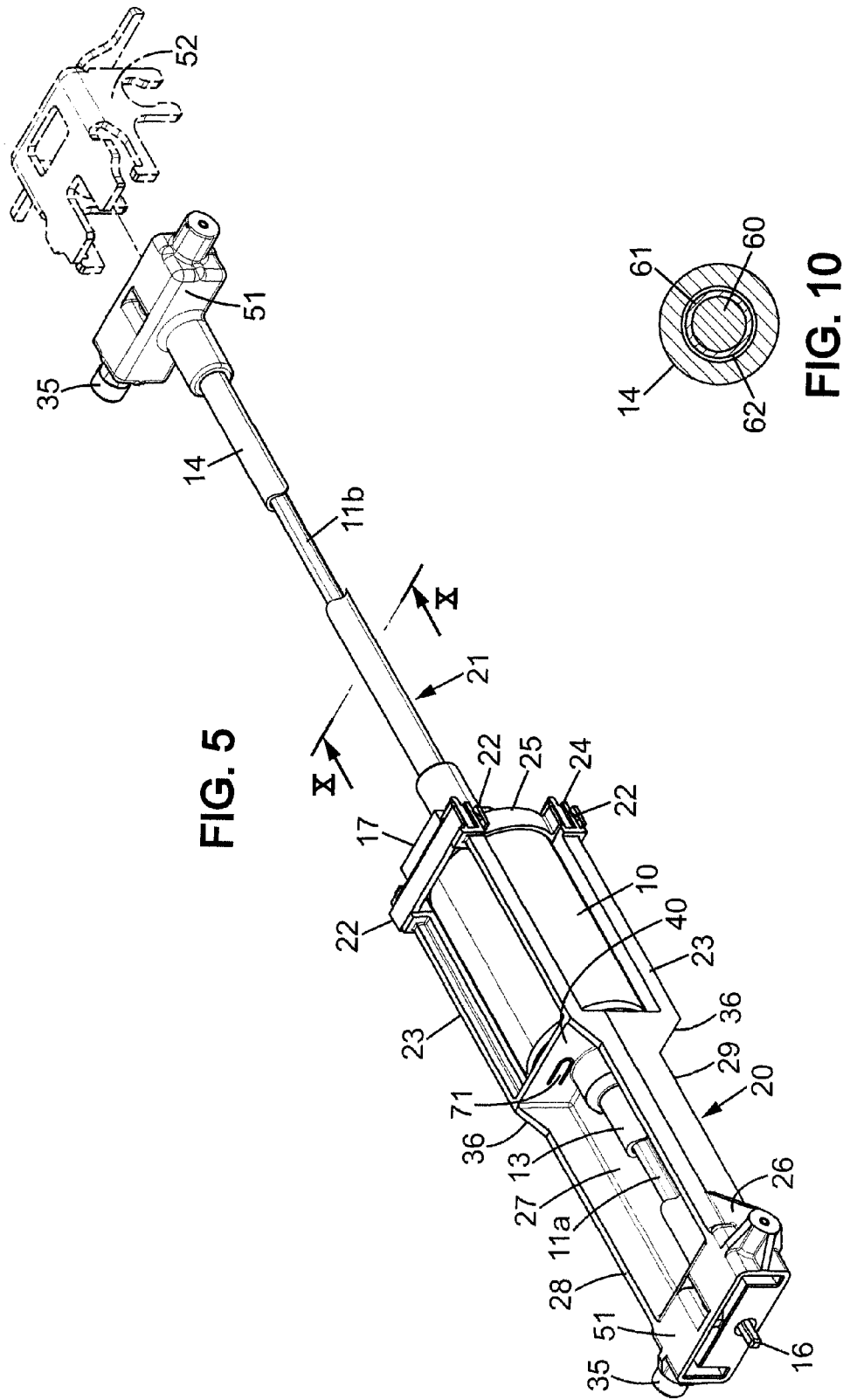
FIG. 5 is a perspective view, partially cut away, of the motorisation device in FIG. 4.
Figure 6:
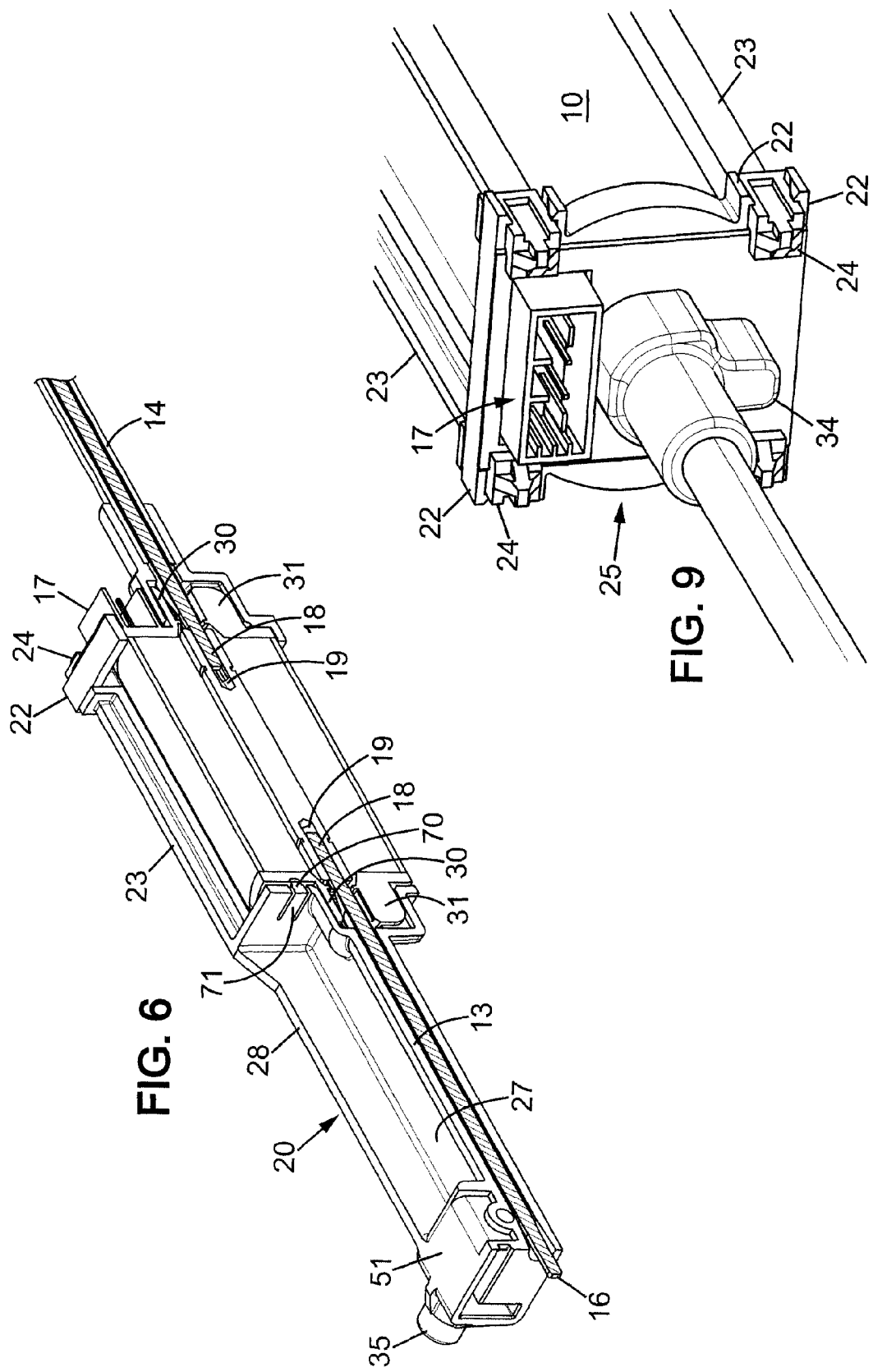
FIG. 6 is a vertical longitudinal cross-section view of a portion of the motorisation device in FIG. 5, FIGS. 7 and 8 are perspective views of two support members belonging to the motorisation device.

FIGS. 5 and 6 show a cut-away view of the full motorisation device according to still the first embodiment of the invention. In these figures the motor 10 and the first support member 20 are in particular revealed which comprises a plurality of flexible arms 23 creating a housing for the motor 10. Said flexible arms have hooks 24 which maintain the other support member 21 in an assembly position.

Said second support member has an end 25 provided with a end plate 41, substantially vertical, applied to the face 43 of the motor, in parallel to the latter. This end plate 41 is provided with fastening clips 22 which cooperate with the hooks 24 of the arms of the first support member in order to lock them in the maintained position, as this can also be seen in detail in FIG. 9. The tip of each arm 23 is engaged in a corresponding U-shaped housing present in the end plate 41, the hook 24 bearing against the exterior face of the end plate 41. Flexible clips 22 arranged in said U-shaped housings make it possible to immobilise each of the arms 23 according to the axis X and as such prevent any separation of the assembly of the two support members.

Any other form of hook and retention clip can be used while still remaining within the scope of the invention.

Returning now to FIGS. 5 and 6, the flexible connection 11a is housed inside the guide 13 of the first support member 20 and the flexible connection 11b is housed inside the guide 14 of the second support member 21. These flexible connections are flocked cables driven into rotation by the motor 10. Usually, such cables are covered by protective sheaths which do not turn when the cable is turning. The invention advantageously makes it possible to spare such sheaths, as the sheathing function is carried out by the internal face of the guide (respectively 13 and 14) of the support member (respectively 20 and 21), this can be seen particularly in a detailed manner in the section in FIG. 10. The flexible connection is comprised of a metal core 60 covered with a layer of flocking 61 intended to decrease the operating noise. A minimum play 62 can be provided between the flexible connection and the jacket which constitutes the internal face of the guide 14 of the support member 21; but the flocking 61 can also be slightly compressed, therefore without play in relation to the jacket which constitutes the internal face of the guide 14.

The end 16 of each of the flexible connections cooperates with the adjustment mechanism 12 for adjusting the first and second tracks 5. At this location, the ends of each of the anchoring parts 51 are nested respectively in the counterparts 52 of the mobile element 6 of the track. This nesting is where applicable secured by a screw 35, which advantageously crosses the entire anchoring part 51 along the axis X.

FIG. 6 further makes it possible to view the nesting of the square tips 18 of the flexible connections in female orifices 19, more preferably square, located in the rotor of the motor, on each of its two ends. Any other form without revolution can also be used for the tips 18 and the housings 19 without departing from the scope of the invention.

The support member 20 has reinforcement ribs in order to support the weight of the motor as well as the accelerations and impacts which can occur during the course of the use of the vehicle. To this effect, a first horizontal rib 27 extends on either side of the guide 13, according to the transversal direction Y, across the entire length of said guide. This rib directly connects the end plate 40 of the support member, located on one end, in interface of the face 42 of the motor, to the anchoring part 51 of the support member, on the other end, which is fixed on the rail 6 by the intermediary of the counterpart 52. This rib 27 is furthermore directly connected to the guide 13.

This horizontal rib 27 is connected in turn to two vertical ribs 28, 29, located in the plane YZ, which delimit said horizontal rib 27. The first rib 28 and the second rib 29 are fixed respectively to the radial ends of the rib 27. These ribs 28, 29 extend across the entire length of the support member 20 and connect on the one hand the end plate 40 of the support member and on the other hand the anchoring part 51 of the support member integral with the rail 6.

These horizontal and vertical ribs are supplemented by complementary reinforcement triangles: a first horizontal triangle 26 extends from the centre axis of the rib 29 towards the end of the housing of the screw 35 in the anchoring part 51. Another equivalent rib symmetrical in relation to the axis Y1, not shown in FIG. 5 but visible in FIG. 8, connects in the same manner the rib 28 to the anchoring part 51. Furthermore, other vertical reinforcement triangles 36 connect the ribs 28 and 29 to the end plate 40 of the support member, to the roots of the arms 23.

Figure 7:
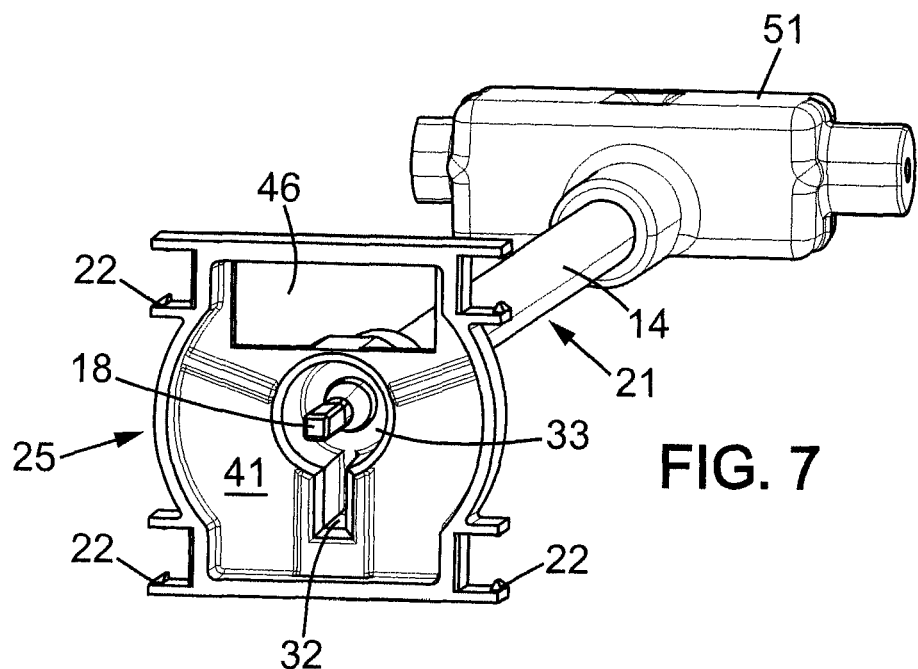

FIG. 7 shows a more detailed view of the end 25 of the support member 21. This end comprises in particular the end plate 41 intended to receive the face 43 of the motor 10. This end plate is provided with a central cylindrical portion 33 wherein is engaged the tip 30 of the motor, of a notch 32 in the form of a complementary portion in relief of the portion in relief 31 present on the face 43 of the motor. In the assembled position, the portion in relief 31 is engaged in the complementary portion in relief 32 in order to prevent the rotation of the motor 10 in relation to the support member 21 around the axis Y1. Furthermore, an opening 46 is provided which makes possible the passage of the electrical connector 17 of the motor, and a plurality of clips 22 which immobilise the hooks 24 of the arms 23 of the first support member 20, such as is shown in detail in FIG. 9. The flexible connection 11b is contained in the guide 14 and its end 18, of non-circular section, comes to engage into the corresponding housing 19 in the motor.

Figure 8:
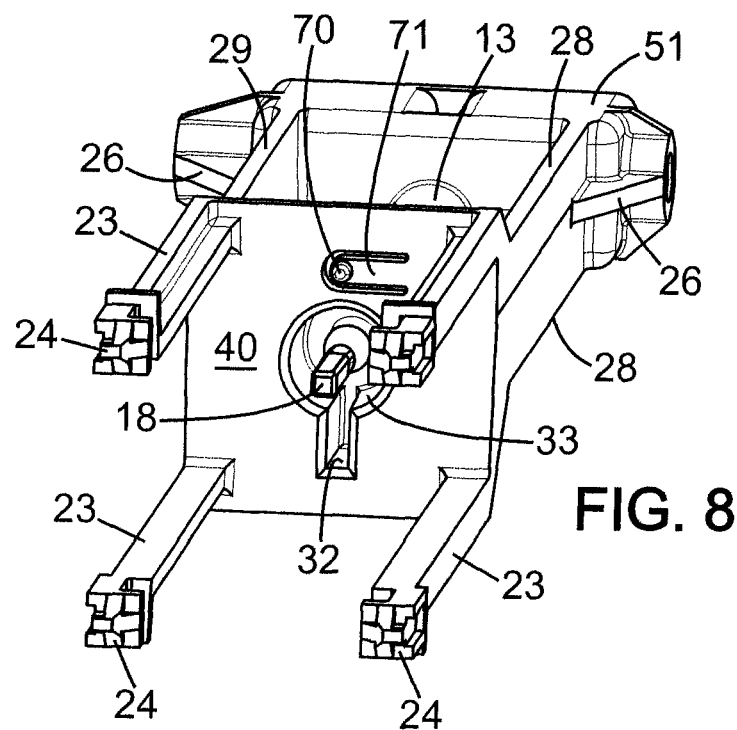

In a similar manner, FIG. 8 shows another view of the first support member 20 containing interface elements with the motor 10 and with the second support member 21. Here are located in particular the end plate 40 which receives the face 42 of the motor. This end plate comprises a central cylindrical portion 33 wherein is inserted the tip 30 of the motor and a notch 32 in the form of a complementary portion in relief of the portion in relief 31 present on the face 42 of the motor. In assembled position, the portion in relief 31 is engaged in the complementary portion in relief 32 in order to prevent the rotation of the motor 10 in relation to the support member 20 around the axis Y1.

In addition the support member 20 is provided with a plurality of flexible arms 23, more preferably of plastic material and coming from the manufacturing method as a single part of the support member.

Finally the support member 20 is provided with reinforcement ribs 28, 29 already described hereinabove, able to maintain the motor in position in the event of substantial acceleration or impacts. These substantially vertical ribs 28 are supplemented by horizontal reinforcement triangles 26.

Moreover, in reference to FIGS. 5, 6 and 8, the invention further proposes on the end plate 40 of the support member 20 an elastic tab 71 provided with a pin 70 protruding axially towards the interior in relation to the end plate 40 of the support member. This pin 70 mounted on its elastic tab 71 makes it possible to recover any play in the assembly of the motor between the two support members, decreasing as such the operating noise. Advantageously, said tab provided with said pin in made more preferably of plastic material and comes from the method of manufacturing as a single part of the support member 20.

The second embodiment of the invention, shown in FIGS. 11 to 14, is similar to the first embodiment and will not be described here again in detail. In particular, in this second embodiment:
- the general sizing of the seat and of the tracks can be similar to that in FIGS. 1 to 3,
- the motor 10, the first flexible connection 11a and the first support member can be identical or similar to the first support member 20 of the first embodiment described hereinabove,
- the method of fastening between the first and second support members can also be identical or similar to the first embodiment.

Figure 12:
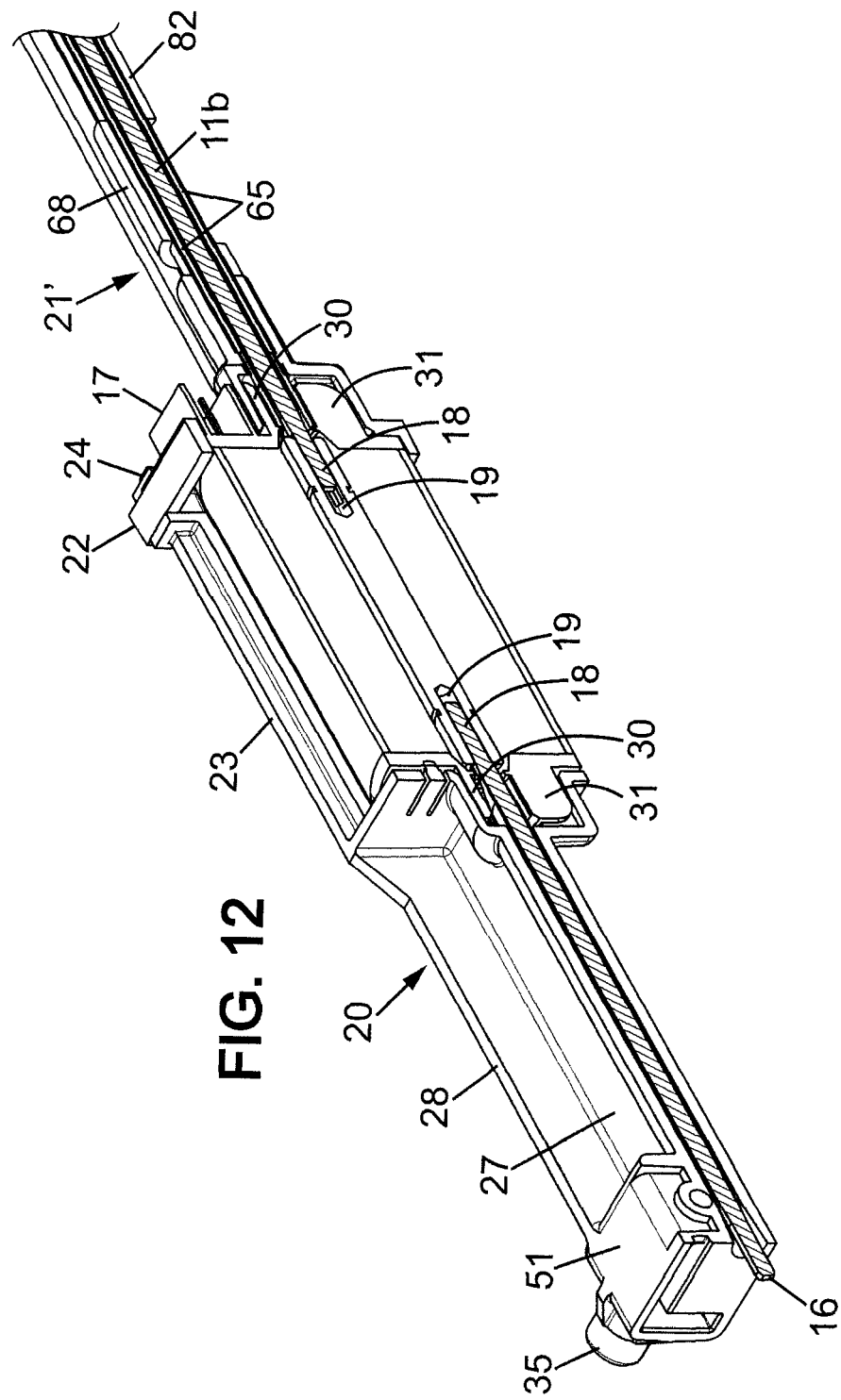

FIGS. 11 and 12 show all of the motorisation device in this second embodiment, which differs from the first embodiment substantially by the second support member 21' and the second flexible connection 11b'.

In this second embodiment of the invention, the end 25 and the end plate 41 of the second support member 21' can also be identical to the first embodiment and the different characteristics of the second support member 21' primarily relate to the guiding of the flexible connection 11b'.

Indeed, the support member 21' comprises a guide 14' which does not surround the flexible connection over its entire length but has upper guides 68 and lower guides 82 in which the flexible connection 11b' is engaged, these upper and lower guides able to maintain the flexible connection 11b' in position. These upper and lower guides 68, 82 follow each other in an alternating manner, over the entire length of the second support member 21'. These guides are in the form of semi-cylindrical troughs and are arranged so that their concave interior surfaces 68a, 82a are aligned along the same cylindrical surface (see FIGS. 13 and 14).

The support member 21' has reinforcement ribs in order to increase the rigidity of the motorisation device. To this effect, a first horizontal rib 81 extends on either side of the guide 14', according to the transversal direction Y, across the entire length of said guide. This rib directly connects the end plate 41 of the support member, located on one end, in interface with the face 43 of the motor, to the anchoring part 51 of the support member, on the other end, which is fixed on the rail 6 by the intermediary of the counterpart 52. This rib 81 is furthermore directly connected to the guide 14'.

This horizontal rib 81 is connected in turn to two vertical ribs 80, located in the plane YZ, which frames said horizontal rib 81. The first rib and second vertical ribs 80 are fixed respectively to the radial ends of the rib 81. These ribs 80 extend across the entire length of the support member 21' and link on the one hand the end plate 41 of the support member and on the other hand the anchoring part 51 of the support member which is fixed on the rail 6.

These horizontal and vertical ribs are supplemented by complementary reinforcement triangles: first and second horizontal triangles 83 extend respectively from the first and second rib 80 towards the anchoring part 51.

The second flexible connection 11b' comprises, as is shown in FIGS. 13 and 14, a metal core 60 covered with a layer of flocking 61 intended to decrease the operating noise. This flocked core is housed in a sheath 65 that does not turn with said core, requiring the presence of a minimum play 62. The sheath 65 can be maintained in the upper guides 68 and lower guides 82 by the intermediary of small longitudinal bosses 64 arranged on the interior faces 68a, 82a of these guides.

The invention claimed is

1. The track assembly for a vehicle seat, comprising:
   first and second parallel tracks extending along a longitudinal direction and each comprising an adjustment mechanism,
   an electric motor adapted to drive the adjustment mechanisms for adjusting said tracks, and connected to said adjustment mechanism by flexible connections,
   first and second support members connecting the motor respectively to the first and second tracks, the first and second support members being two separate pieces which are assembled to each other so as to support the motor, each of the first and second support members being manufactured as a single part,
   wherein each of said first and second support members is fixed exclusively to the electric motor and to one of first and second tracks, the first support member being shorter than the second support member and able to support the motor,
   wherein said first and second support members are fixed to one another,
   and wherein said first and second support members comprise guides for retaining the flexible connection, the flexible connections extending over a certain length and said guides rigidly surrounding the flexible connection over a major portion of said length.

2. The track assembly according to claim 1, wherein said guides are tubular.

3. The track assembly according to claim 1, wherein said guides comprise, along the flexible connection, a succession of guide troughs arranged alternating on either side of said flexible connection.

4. The track assembly according to claim 1, wherein the flexible connection comprises a rotating core driven by the motor, said rotating core turning in contact with said guides.

5. The track assembly according to claim 1, wherein the flexible connections comprise a rotating core driven by the motor, said rotating core turning in a tubular sheath which itself is contained in the guide.

6. The track assembly according to claim 1, wherein the support member is formed of a single part of plastic material.

7. A vehicle seat comprising a seat carried by a track assembly according to claim 1.

8. A track assembly for a vehicle seat, comprising:
   first and second parallel tracks extending along a longitudinal direction and each comprising an adjustment mechanism, an electric motor adapted to drive the adjustment mechanisms for adjusting said tracks, and connected to said adjustment mechanisms by flexible connections, first and second support members connecting the motor respectively to the first and second tracks wherein each of said first and second support members is fixed exclusively to the electric motor and to one of first and second tracks, wherein the first support member comprises flexible arms which each extend along the motor down to a free end provided with a hook which is hooked to the second support member and wherein the motor extends in the longitudinal direction between the first and second ends, the first support member comprises a first end plate which receives the first end of the motor, the second support member comprises a second end plate which receives the second end of the motor, the arms of the first support member are integral with the first end plate and the hooks of said arms are hooked onto the second end plate.

9. The track assembly according to claim 8, wherein the hooks are hooked onto the second end plate in such a way as to prevent a separation of the first and second support members in the transversal direction and are retained on said second end plate via clipping.

10. The track assembly according to claim 8, wherein at least one of the first and second ends of the motor comprises a portion in relief which cooperates by nesting with a complementary portion in relief arranged in one of the first and second end plates in order to prevent a relative rotation of the motor in relation to said end plate.

11. A vehicle seat comprising a seat carried by a track assembly according to claim 8.

* * * * *